United States Patent [19]

Wartelle et al.

[11] 4,019,379
[45] Apr. 26, 1977

[54] PNEUMATIC ROUGHNESS MEASURER

[75] Inventors: Claude Wartelle, Gouvieux; Michel Leveque, Champigny-sur-Marne, both of France

[73] Assignee: Centre Technique des Industries Mecaniques, Senlis, France

[22] Filed: Apr. 12, 1976

[21] Appl. No.: 676,341

[52] U.S. Cl. .................................. 73/105; 73/37.5
[51] Int. Cl.² .......................................... G01B 5/28
[58] Field of Search .......... 73/105, 104, 37.5, 37.7, 73/37.6; 33/DIG. 2

[56] References Cited

UNITED STATES PATENTS

| | | | |
|---|---|---|---|
| 2,901,906 | 9/1959 | Emmons | 73/105 |
| 2,963,900 | 12/1960 | Kuebler | 73/105 |
| 3,271,997 | 9/1966 | Horne et al. | 73/37.7 |
| 3,482,433 | 12/1969 | Gladwyn | 73/37.5 |
| 3,490,058 | 1/1970 | Fortier | 73/37.5 |
| 3,855,843 | 12/1974 | Yagiela et al. | 73/105 |

FOREIGN PATENTS OR APPLICATIONS

| | | | |
|---|---|---|---|
| 867,168 | 12/1952 | Germany | 33/DIG. 2 |
| 782,752 | 9/1957 | United Kingdom | 73/104 |

*Primary Examiner*—James J. Gill
*Assistant Examiner*—Anthony V. Ciarlante
*Attorney, Agent, or Firm*—McDougall, Hersh & Scott

[57] ABSTRACT

A method for measuring the surface roughness of a workpiece, comprising filling two capacitors with a compressed gas at specific pressures; applying to the rough surface of the workpiece to be studied the open end of a bell-form sensor connected to a second one of the capacitors; evacuating simultaneously and individually to atmosphere the two capacitors, the first through a calibrated throttle, the second through the leak existing between the edge of said sensor bell and the rough surface of the workpiece; measuring, during evacuation, the difference between the pressures in the two capacitors; and deducing from this pressure differential, by standardization with sample pieces of known roughness, the roughness of the piece studied.

14 Claims, 3 Drawing Figures

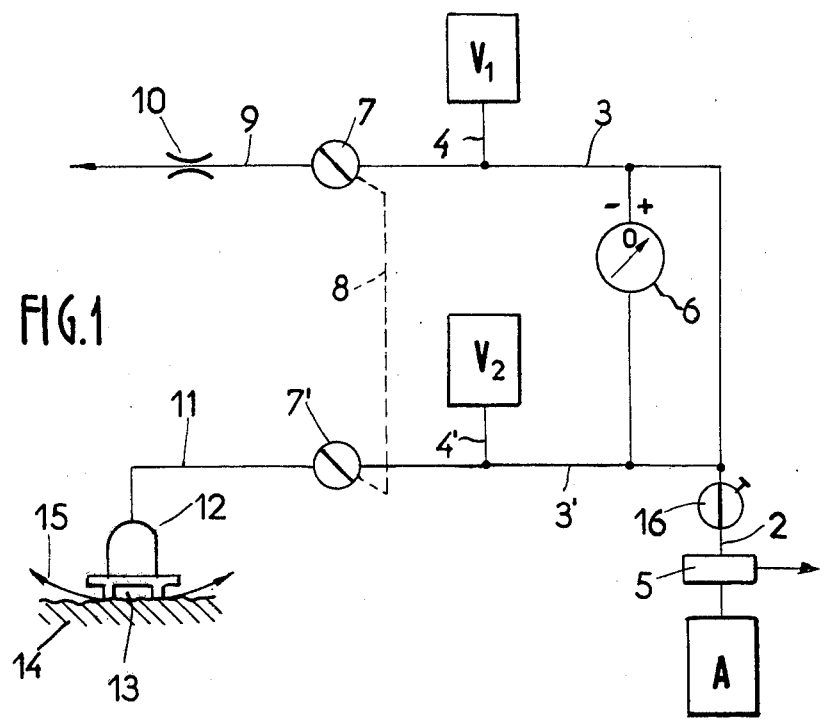
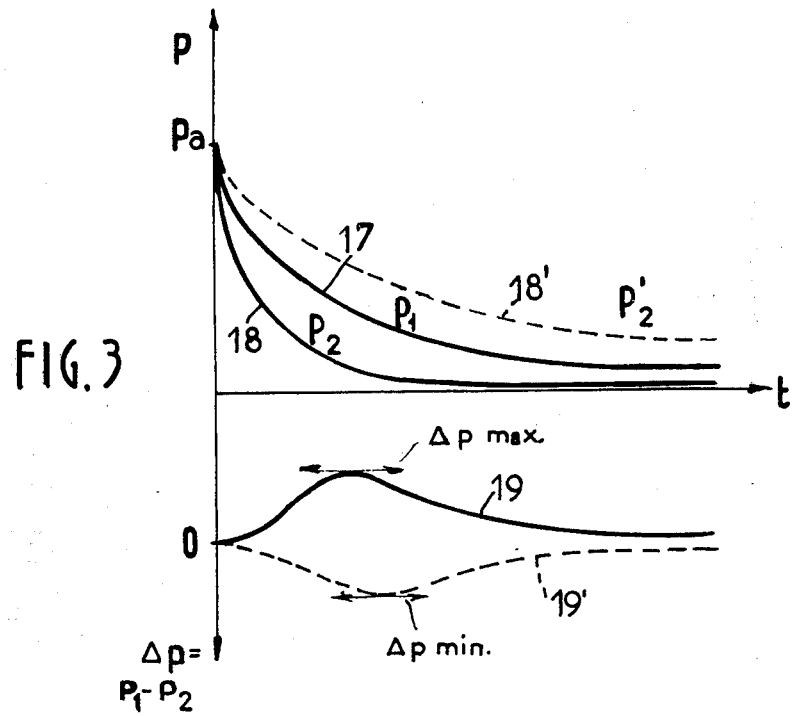

PNEUMATIC ROUGHNESS MEASURER

The present invention relates to a method and apparatus for pneumatically measuring the roughness of workpieces.

The principle of measurement of roughness of a workpiece by a pneumatic method is known, and consists essentially in measuring the leakage flow between the workpiece to be studied and a sensor comprising a bell-shaped mouth whose open edge is applied against the piece. By means of comparison with the leak obtained on a sample workpiece of known roughness, the roughness of the piece under study may be deduced.

A roughness meter applying a pneumatic measurement method has been described, for example, in the publication "British Corrosion Journal", vol 2 July, 1967, the apparatus principally consisting of a gas source under pressure which supplies in series a calibrated throttle or "resistance", and the bell of the sensor, the apparatus also comprising two pressure collectors $P_1$, $P_2$ connected upstream and downstream of the throttle. The difference in pressure $P_1$, $P_2$ is representative of the flow output at the surface contact between the sensor and the workpiece, i.e. of the roughness of the piece. However, this known method has the disadvantage, resulting from the assembly in series of the "calibrated resistance" and of the "leak resistance", that the supply pressure must not only be perfectly identical from one measurement to the other, which may require in practice calibration of the apparatus before each measurement, but must also remain perfectly constant during the entire duration of a measurement.

The result is that, in order to be precise, apparatus operating according to this method must comprise regulating accessories which are relatively clumsy and complicated, which renders their use "on site" impossible, and which, conversely, if one wishes to render them portable, then have insufficient precision or measurement range. Thus certain portable apparatus operating according to this method only allows indication of whether the piece under study has a greater or lesser degree of roughness ("bad" or "good" pieces) than a standard roughness, but without giving the value itself of the roughness under study.

It is an object of the present invention to obviate or mitigate the above disadvantages.

According to one aspect of the present invention there is provided a method for measuring the surface roughness of a workpiece, comprising filling two capacitors with a compressed gas at specific pressures; applying to the rough surface of the workpiece to be studied the open end of a bell-form sensor connected to a second one of the capacitors; evacuating simultaneously and individually to atmosphere the two capacitors, the first through a calibrated throttle, the second through the leak existing between the edge of said sensor bell and the rough surface of the workpiece; measuring, during evacuation, the difference between the pressures in the two capacitors; and deducing from this pressure differential, by standardisation with sample pieces of known roughness, the roughness of the piece studied.

Preferably, the two capacitors have an identical volume and, also preferably, the two capacitors are filled to the same specified pressure.

Contrary to known methods in which the pressure must be kept constant during the whole measuring operation, according to the present invention the measurement is carried out during the decrease in pressure, during the evacuation of the two capacitors, and it is this comparison of the decrease, more or less rapid, in the pressure in the two capacitors, which allows determination of the roughness of the piece.

In particular, as will be seen later, the difference in the pressures passes during evacuation through a maximum value (positive or negative) and it is by reading off this maximum value that, after standardisation on sample pieces, the roughness is determined.

According to another aspect of the present invention there is provided apparatus for measuring the surface roughness of a workpiece, including two sealed capacitors; a bell-form sensor whose mouth is adapted to be applied against the rough surface to be tested; and pneumatic switching means movable to a first position in which the two capacitors are connected to gas supply means for filling said capacitors, and to a second position in which the two capacitors are simultaneously and respectively connected, to a calibrated discharge throttle, and to the sensor respectively for carrying out a roughness test.

In such an apparatus, the pressure is read off preferably by means of a differential manometer indicating directly the pressure differential between the two capacitors during measurement.

The invention will be better understood on reading the following detailed description and on examining the annexed drawings, which are given by way of non-limiting examples, and which show embodiments of the present invention.

These drawings show:

FIG. 1 shows a diagrammatic view of a roughness measuring meter for pneumatically measuring surface roughness;

FIG. 3 shows the curves of pressure variation during roughness measurement using the above apparatus.

Figure 2:
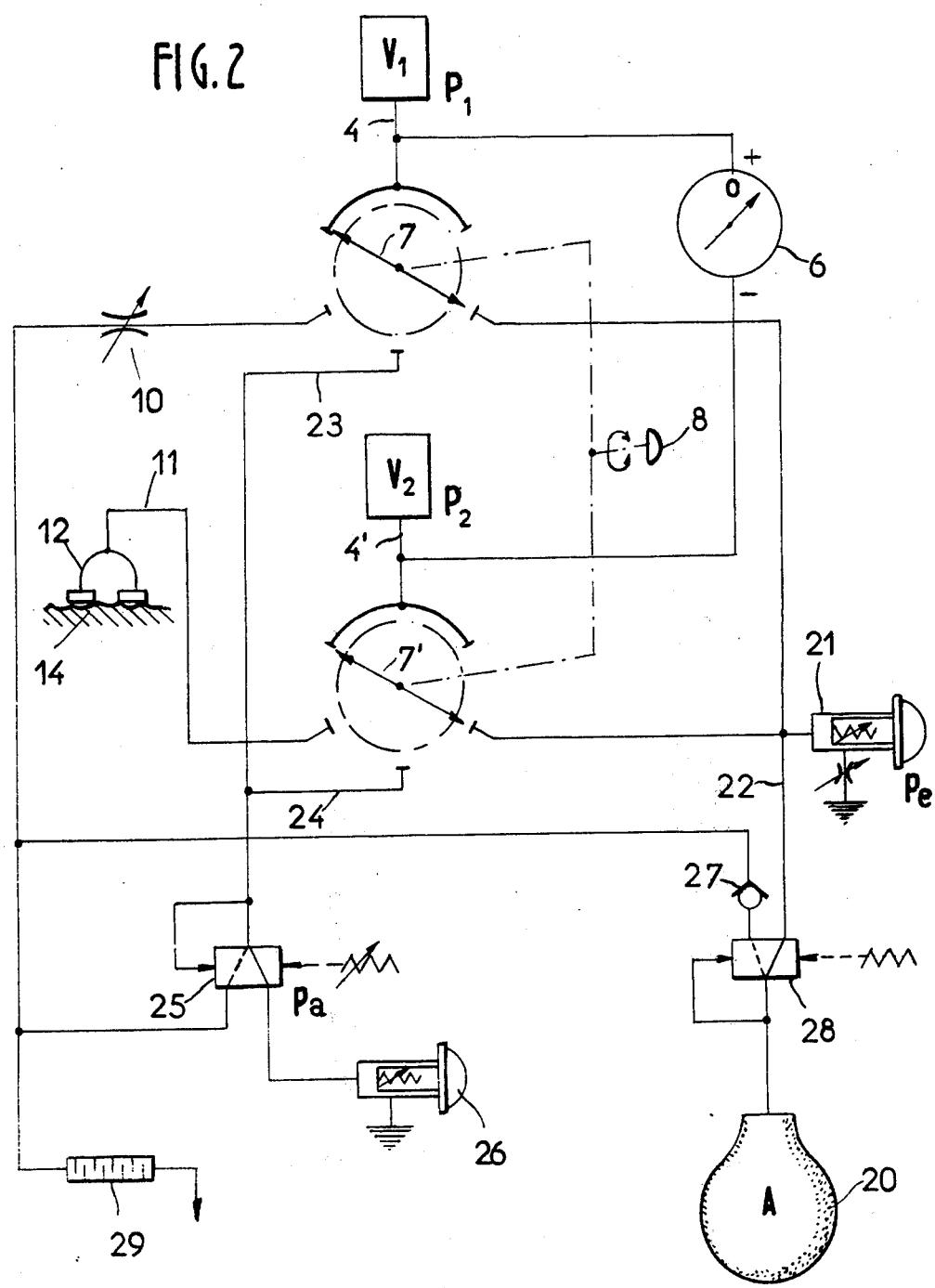
FIG. 2 shows the different pneumatic circuit of a roughness meter according to a second embodiment of the present invention.

The diagram in FIG. 1 comprises only those elements essential for carrying out the presently described roughness measuring method, viz.: two sealed capacitors $V_1$, $V_2$ pressure fluid supply means A for example a reserve of compressed gas, a pump or an elastic bulb, connected to the capacitors $V_1$, $V_2$ by conduits 2, 3, 4, 3', 4' and enabling the two capacitors to be filled with gas, particularly air, at a specified pressure fixed by a calibrated valve 5; a differential pressure collector 6 connected between the two capacitors $V_1$, $V_2$; and means of pneumatic switching 7, 7' actuable simultaneously by means of a single control 8.

In the measurement position, the switch 7 connects capacitor $V_1$ to the atmosphere, through a conduit 9 in which there is incorporated a throttle or calibrated resistance 10, while the switch 7' connects capacitor $V_2$ also to atmosphere, but through a flexible conduit 11 and a measurement head of sensor 12 having a sealed bell 13 whose mouth is placed in contact with the rough surface 14 to be measured. It is the leak flow (indicated by arrows 15 in FIG. 1) between the rough surface and the contact surface of the sensor which represents the surface roughness of the workpiece studied. In the inoperative position, the switches 7 and 7' isolate the capacitors $V_1$, $V_2$ from atmosphere.

Another means of pneumatic switching enables connection (during filling) or separation (during measurement) of the source of compressed air to or from capacitors $V_1$, $V_2$. This other means may be simply constituted by the automatic calibrated valve 5 or by a manually-controlled stop flap 16.

In a preferred arrangement, the two capacitors $V_1$, $V_2$ are identical in volume, and are filled, via supply means A, to a specified identical pressure $P_a$, prior to the commencement of a measurement operation. However, it will be understood that the present invention covers the cases where the volumes of $V_1$ and $V_2$ are different as well as their filling pressures; in this case the single calibrated valve 5 then being replaced by two individual calibrated valves interposed for example respectively in conduits 3 and 3'.

The method of operation of the apparatus shown in FIG. 1 is as follows: prior to measurement, the two capacitors $V_1$, $V_2$ are filled with air at pressure $P_a$. If the calibrated valve 5 does not fulfil, or imperfectly fulfils the function of separation, the stop flap 16 is closed. At this moment the differential manometer 6, which is a central-zero device i.e. indicates positive or negative values, is set at zero.

The sensor 12 is applied to the rough surface to be studied, then, the switches 7 and 7' are simultaneously opened by means of the control 8, so that the two capacitors $V_1$, $V_2$ are evacuated to atmosphere and their pressures diminish, in tending to approach atmospheric pressure, in accordance with an exponential curve.

The variation in pressure P is a function of evacuation time $t$ of the capacitor $V_1$ through the calibrated throttle 10, and is shown by curve 17 in FIG. 3.

If it is supposed that the piece studied has a high degree of roughness producing a relatively large leak flow, corresponding to a resistance less than that of the calibrated resistance 10, the capacitor $V_2$ will evacuate more rapidly than capacitor $V_1$, i.e. its pressure $V_2$ (shown by curve 18 in FIG. 3) will drop more quickly than the pressure $P_1$ of capacitor $V_1$.

At each instant of evacuation the differential manometer 6 will indicate the value $\Delta_p = P_1 - P_2$ which is shown, always as a function of the time $t$ of evacuation, by the curve 19 shown in the lower portion of FIG. 3.

This curve passes through a maximum ($\Delta_p$ max) which may simply be read on the differential manometer 6, and which defines the roughness of the piece once the apparatus has been standardised by measurements of $\Delta_p$ max on samples of known roughness.

Inversely, in the case of a piece of lesser roughness, which produces a leak output less than that of the calibrated resistance 10, the pressure $P'_2$ of the capacitor $V_2$ will drop more slowly than that of capacitor $V_1$ (see curve 18') and the differential pressure $\Delta_p = P_1 - P'_2$ will pass through a minimum (see curve 19') which will translate the roughness of the piece, readings being taken in this case on the differential manometer, on the other side of the central zero.

Likewise, according to another method of operation, one could read off the differential pressure $\Delta_p$ at the end of a determined time, which is always the same, after the beginning of evacuation, but this reading would be less precise, because the benefit of reading at maximum deviation (from one side or the other), of the manometer would not be exploited, and the operator would be responsible for a time-count which is avoided during the first method of operation.

FIG. 2 shows a preferred embodiment of a roughness meter according to the invention, including certain modifications, over the simplified apparatus shown in FIG. 1, enabling more precise and more rapid measurements. The items which are identical or similar in FIGS. 1 and 2 carry the same reference numerals.

The said modifications all have the purpose to enable filling of capacitors $V_1$, $V_2$ at a pressure $P_a$ which is always identical, despite the different methods by which different operators actuate the supply means for compressed air A, in the present case of a portable roughness meter, a rubber bulb 20.

In fact it will be clear that it is preferable to fill the capacitors firstly to a pressure $P_e$ above the pressure $P_a$ selected for the beginning of measurement then partially to evacuate the capacitors until the pressure $P_a$ is stabilised before the roughness measurement proper commences.

With this purpose in mind, the circuit of the apparatus shown in FIG. 2 comprises a pressure collector 21, for example a slide-vane which is incorporated in conduit 22, which connects bulb 20 to the capacitors $V_1$ and $V_2$, and which is calibrated to the pressure $P_e$. Moreover, supplementary switching means enable connection of capacitors $V_1$, $V_2$ to a partial evacuation and stabilisation circuit 23, 24 which opens to atmosphere through a regulating discharge valve 25 calibrated to pressure $P_a$.

In the embodiment shown, all the switching pneumatic means are grouped into two rotary switches 7, 7' with three positions, twinned by a control 8. By means of these switches, the capacitors $V_1$ or $V_2$ are connected:

a. In the first position, to the filling bulb 20;
b. In the second position, to the partial evacuation and stabilisation circuit 23, 24, 25; and
c. In the third position (measurement position), respectively to the calibrated resistance 10 and the sensor 12.

In order to use the apparatus, the switches 7, 7' being in the first position shown in FIG. 3, the bulb 20 is actuated until the pressure $P_e$ (greater than $P_a$) is reached, which is shown by the pressure collector 21. Switches 7, 7' are then brought into the second position, in order to stabilise the pressure in the capacitors $V_1$, $V_2$ at the pressure $P_a$ fixed by the calibrated valve 25. Preferably, there is connected to valve 25 a visual indicator 26 showing the operator that the valve 25 has closed again, and that consequently the pressure $P_a$ has been reached in the capacitors $V_1$ and $V_2$. Finally, after applying the sensor 12 to the rough surface 14 to be studied, the switches 7, 7' are brought into the third position in order to measure the leak by means of the differential manometer 6, by reading off the maximum or minimum differential pressure as has been stated above.

The bulb 20 is of course provided with suction-back-pressure valves 27, 28 suction being preferably effected through a filter 29. In the case where the roughness meter is portable, the casing of the apparatus serves as a settling and filtration chamber for the air.

By way of example, it may be indicated that a roughness meter constructed according to the invention operated at a pressure $P_e$ of about 480 mb, and a pressure $P_a$ of about 330 mb. The calibrated resistance 10, interchangeable if necessary depending on the range to be studied, is of the linear type (capillary tube); the differential manometer 6 possesses a response time of less than 0.1 second at full scale.

With two identical construction devices, but having $V_1$, $V_2$ volumes which are different and different calibrated resistances, it was possible to cover the complete range of the tactile and visual standard which is presently used in industry, and which is indicated by the title "RUGOTEST No. 3", i.e. for criteria of roughness $R_a$ of 1 to 40 microns and $R_p$ of 1 to 60 microns. The resolution is 1 micron, and fidelity is less than 1%. The longest measurements do not exceed 15 seconds, the measurement time varying according to the roughness, as has been indicated above. These devices, although portable, have always given results better than the known apparatus, even non-portable, the metrology.

The above apparatus according to the present invention provides a pneumatic roughness meter operating in a self-contained way, and which is easily portable. The apparatus enables a series of measurements to be carried out rapidly, and supplies directly known criteria ($R_a$, $R_p$) defining the roughness of the piece under study, with a resolution of less than a micron. The duration of the measurement, with the apparatus according to the invention, varies according to the roughness of the piece, but does not exceed a period of 15 seconds.

Naturally, the invention is not limited to the embodiment described and illustrated, but is capable of numerous variations within the scope of the person skilled in the art, depending on the applications envisaged, and without going beyond the scope of the invention as defined in the appended claims.

What I claim is:

1. A method for measuring the surface roughness of a workpiece, comprising filling two vessels with a compressed gas at specific pressures; disconnecting the vessels from the pressure source, applying to the rough surface of the workpiece to be studied the open end of a bell-form sensor connected to a second one of the vessels; evacuating simultaneously and individually to atmosphere the two vessels, the first through a calibrated throttle, the second through the leak existing between the edge of said sensor bell and the rough surface of the workpiece; measuring, during evacuation, the difference between the pressures in the two vessels; and deducing from this pressure differential, by standardization with sample pieces of known roughness, the roughness of the piece studied.

2. A method according to claim 1, wherein the two vessels are filled to the same pressure.

3. A method according to claim 1, wherein the two vessels have an identical volume.

4. A method according to claim 1, wherein the difference between the pressures in the two vessels is noted when it reaches a maximum or minimum value during evacuation.

5. A method according to claim 1, wherein the difference between the pressures in the two vessels is noted at the end of a specified time after the commencement of evacuation.

6. Apparatus for measuring the surface roughness of a workpiece including two sealed vessels, a bell-form sensor whose mouth is adapted to be applied against the rough surface to be tested; and pneumatic switching means movable to a first position in which the two vessels are connected to gas supply means for filling said vessels, and to a second position in which the two vessels are simultaneously and respectively connected to a calibrated discharge throttle and to the sensor respectively for carrying out a roughness test wherein said gas supply means includes a pressure collector for indicating that the vessels are filled to a pressure higher than a predetermined pressure, the switching means having a third position in which the two vessels are connected to atmosphere through a calibrated valve which closes when the pressure in the vessels has dropped to said predetermined value.

7. An apparatus for measuring the roughness of a surface of a workpiece comprising two vessels of specific volume, means for filling said two vessels from a pressure gas source at specific pressures, means for closing said vessels, first and second evacuating means for evacuating the first and the second of said vessels to atmosphere after disconnecting said vessels from said pressure gas source, common control means for simultaneously controlling said first and second evacuating means, a calibrated throttle in said first evacuating means, a bell-shaped sensor in said second evacuating means, said sensor having a mouth to be applied against said workpiece surface to be tested, and differential pressure measuring gauge means connected to said two vessels.

8. Apparatus according to claim 7, wherein the gas supply means comprises control means for the pressure, for filling the two capacitors to the same fixed pressure.

9. Apparatus according to claim 7, wherein the two vessels have an identical volume.

10. Apparatus according to claim 7, wherein said gas supply means supply compressed air to the two capacitors, the supply means comprising an elastic vessel compressible to fill the two vessels.

11. Apparatus according to claim 7 wherein means for differential measurement of the pressures in the vessels is provided and comprise a differential manometer indicating positive and negative differential pressure values.

12. Apparatus as claimed in claim 7 in which said vessel filling and evacuating means comprise first 3-position valve means having a port which is permanently connected to said first vessel and which, through operation of said valve means, is adapted to be selectively connected to two other ports respectively connected to said source of pressure gas and to said calibrated throttle, and second 3-position valve means having a port which is permanently connected to said vessel and which, through operation of said valve means, is adapted to be selectively connected to two further ports respectively connected to said source of pressure gas and to said bell-shaped sensor, and said common control means being operatively connected to both said first and second 3-way valve means.

13. Apparatus as claimed in claim 7 in which said filling means comprises pressure collector means for indicating that said vessels are filled to a pressure higher than said specific pressure, the apparatus further comprising prior partial evacuating means comprising a calibrated valve adapted to close upon the pressure in said vessel reaching down to said specific pressure.

14. Apparatus as claimed in claim 7 in which said vessel filling and evacuating means comprises first 3-position valve means having a port which is permanently connected to said first vessel and which, through operation of said valve means, is adapted to be selectively connected to three further ports themselves respectively connected to said source of pressure gas, to said calibrated throttle, and to said prior partial evacuating means, and second 3-position valve means having a port which is permanently connected to said second vessel and which, through operation of said valve means, is adapted to be selectively connected to three further ports themselves respectively connected to said source of pressure gas, to said bell-shaped sensor, and to said prior partial evacuating means.

* * * * *